United States Patent
Kilpatrick et al.

[11] Patent Number: 5,875,539
[45] Date of Patent: Mar. 2, 1999

[54] WATER-COOLED STATOR COIL END SEALING PROCESS

[75] Inventors: Neil Leslie Kilpatrick, Winter Springs, Fla.; George Franklin Dailey, Pittsburgh, Pa.

[73] Assignee: Siemens Westinghouse Power Corporation, Orlando, Fla.

[21] Appl. No.: 746,698

[22] Filed: Nov. 14, 1996

[51] Int. Cl.[6] .................................................. H02K 15/00
[52] U.S. Cl. ........................... 029/596; 29/598; 29/402.4; 29/402.18; 228/119; 310/42; 310/43; 310/54; 310/64; 310/65
[58] Field of Search ........................ 29/596, 598, 402.04, 29/402.18; 228/119; 310/42, 43, 54, 64, 65

[56] References Cited

U.S. PATENT DOCUMENTS

| | | | |
|---|---|---|---|
| 3,614,493 | 10/1971 | Collings et al. | 310/54 |
| 3,978,359 | 8/1976 | Kultzow et al. | 310/260 |
| 4,199,700 | 4/1980 | Daugherty et al. | 310/71 |
| 4,274,021 | 6/1981 | Kamiya et al. | 310/54 |
| 4,806,807 | 2/1989 | Levino | 310/71 |
| 4,912,831 | 4/1990 | Levino | 29/596 |
| 4,982,122 | 1/1991 | Rowe et al. | 310/54 |
| 5,423,473 | 6/1995 | Dailey et al. | 228/44.3 |
| 5,528,827 | 6/1996 | Dailey et al. | 29/890.052 |
| 5,557,837 | 9/1996 | Thiard-Laforet et al. | 29/596 |
| 5,581,869 | 12/1996 | Travaly | 29/596 |
| 5,605,590 | 2/1997 | Manning et al. | 156/94 |
| 5,659,944 | 8/1997 | Thiard-Laforet | 29/596 |

FOREIGN PATENT DOCUMENTS 0724326  7/1996  European Pat. Off. .

OTHER PUBLICATIONS

Taillon, J. et al., "In Place Brazing Solution To Liquid Cooled Stator Winding Leaks", Mechanical Dynamics and Analysis, Inc., Schnectady, NY.

Comprehensive Waterclip Solution, ABB Power Generation, Inc., Richmond, VA.

*Primary Examiner*—Carl E. Hall

[57] ABSTRACT

A process for repairing leaks in turbine generators that have water cooled stator coils with hollow conductor strands, wherein the lead ends of the conductor strands are joined to a header. First a vacuum enclosure is provided around a portion of one of the stator coils in proximity to the header. Then a vacuum is applied to the portion. Finally, a resin is injected into voids in the portion. In a second embodiment, the header first is cut into an outboard section, and into an inboard section that remains attached to the conductor strands. Then the exposed lead ends of the conductor strands and the attached inboard section are cleaned to remove oxidation. Next, a water-tight braze seal is applied over the lead ends of the conductor strands. Then the stator coil and the inboard section are joined to a new outboard section and a vacuum is subsequently applied to the inboard section. The resin is then injected into voids in the inboard section.

19 Claims, 4 Drawing Sheets

WATER-COOLED STATOR COIL END SEALING PROCESS

FIELD OF THE INVENTION

This invention relates generally to the field of turbine generator repair. More specifically, this invention relates to a process for repairing and preventing leaks in liquid cooled stator coils used in turbine generators.

BACKGROUND OF THE INVENTION

Turbine generators used by the electric utility industry generate high temperatures in various generator components. Of particular interest to the present invention, undesirable heat is generated in the stator windings of such generators and must be removed to keep the stator windings from overheating. To provide the necessary cooling to the stators windings in these turbine generators, a variety of techniques have been employed. One technique incorporates hollow individual conductor strands in the stator coil through which a liquid coolant circulates (see e.g., Collins, U.S. Pat. No. 3,614,493, which is hereby incorporated by reference). The coolant collects heat from the conductor strands, carries it away from the stator coil, and releases it.

A stator coil used in such generators is generally comprised of a bundle of individual conductor strands, some of which may have hollow cores, that are collected together to form a single stator coil. At the lead end of the stator coil, where the conductor strands terminate, it is necessary to complete the electrical and coolant flow circuits. For these circuit completion purposes, a conductive header is used that makes the electrical connection while providing a conduit for the coolant to flow through the stator coil. Thus, coolant flows through the header and into the hollow conductor strands of the stator coil where heat is collected. After collecting the heat, the coolant flows out through a header at the other end of the stator coil.

Because the stator coil and the header are separate components, they must be joined together at their interface. Typically, the stator coil is joined to the header with a conductive braze that provides electrical conductivity between the header and stator while providing a fluid-tight seal. In recent years, the electric utility industry has experienced problems with water leakage in turbine generators that use water-cooled stators. Specifically, water leakage around the area of the stator coil to header braze joints has caused generators to fail.

Some water cooled stator coils are susceptible to leaks due to a corrosion process through the consolidated braze. This leads to wetting of the internal coil, subsequent degradation of the groundwall insulation and electrical failure of the coil through the degraded groundwall insulation.

Leaking water can damage insulation and over time cause an electrical failure which can be costly to repair. Leaks have been attributed to poor initial brazes, porosity in cast components, water chemistry issues and crevice corrosion. Crevice corrosion refers to a mechanism which results in corrosion tunneling through the clip-to-strand, or consolidation braze.

Thus, there is a need for a method of repairing the stator coil and header interface to stop the leakage and prevent the likelihood that the leak will recur.

SUMMARY OF THE INVENTION

The present invention provides a process for encasing the coil strands in a solid resin and/or resin composite in order to form a substantial leak barrier. The stator coil repair process of this invention includes a process for preventing leaks in water cooled stator coils having a plurality of hollow conductor strands each having a lead end, and wherein the lead ends of the conductor strands are joined to a header, comprising the steps of providing a vacuum enclose around a portion of one of the stator coils in proximity to the header; applying a vacuum to the portion; and injecting a resin into voids in the portion.

The invention also encompasses a process for preventing leaks in water cooled stator coils having a plurality of hollow conductor strands each having a lead end, and wherein the lead ends of the conductor strands are joined to a header, comprising the steps of sectioning the header into an outboard section, and into an inboard section that remains attached to the conductor strands, such that the lead ends of the conductor strands are accessible; cleaning the lead ends of the conductor strands and the attached inboard section; applying a water-tight braze seal over the lead ends of the conductor strands; after the braze seal has been applied, joining the stator coil and the inboard section to a second outboard section; applying a vacuum to the inboard section; and injecting a resin into voids in the inboard section.

In each case, where the header includes cast components, the external surface of the components may be blasted and a sealant may be applied thereto. This invention further encompasses the stator coil assembly produced by the above processes.

BRIEF DESCRIPTION OF THE DRAWINGS

The foregoing summary, as well as the following detailed description of the preferred embodiment, is better understood when read in conjunction with the appended drawings.

In the drawings.

DETAILED DESCRIPTION OF THE PREFERRED EMBODIMENTS

The invention provides a process for impregnating the coil end structure with resin to fill voids that could lead to leak paths with continued service.

Figure 1:
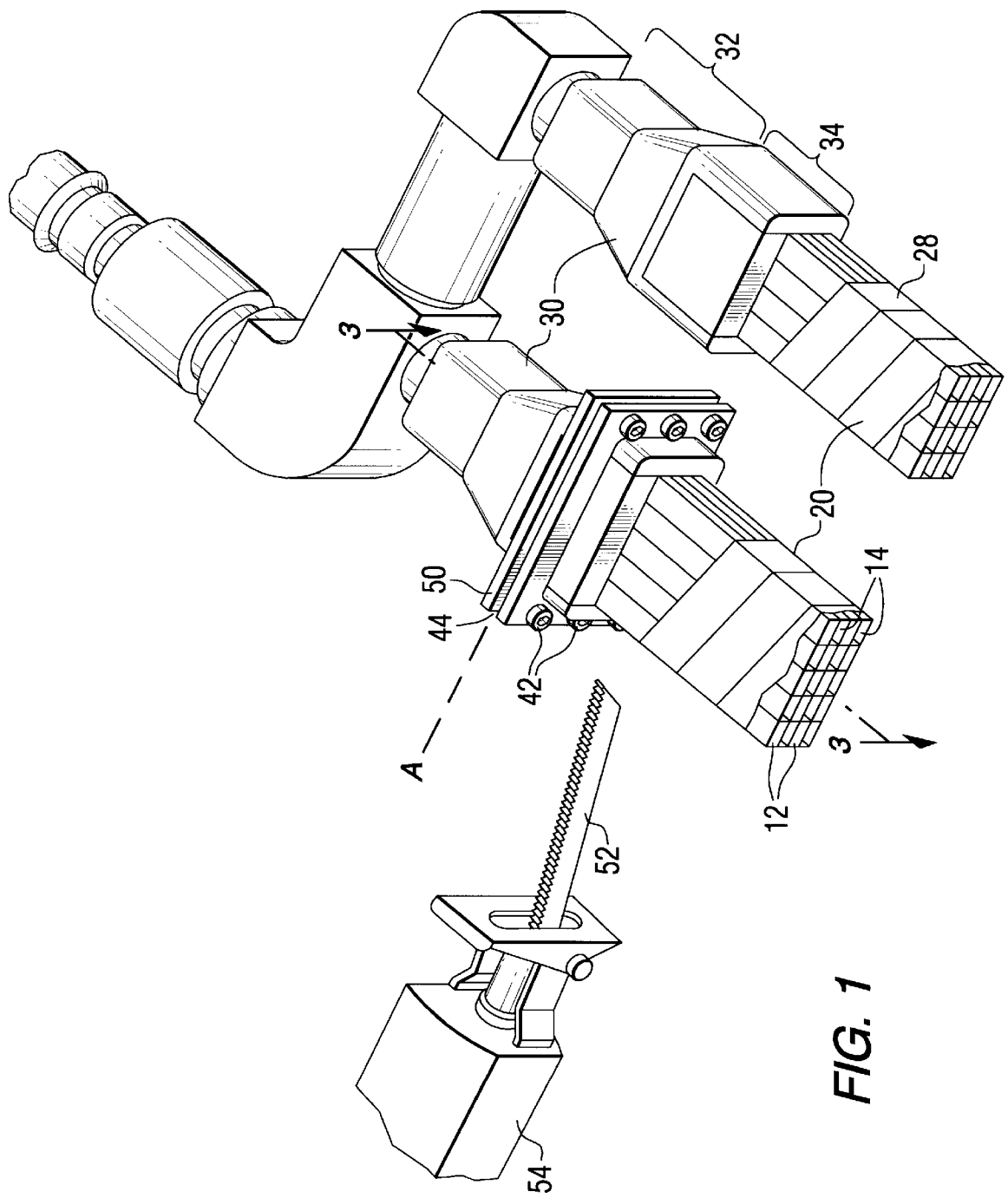
FIG. 1 illustrates a water cooled header connected to stator coils.
Figure 3:
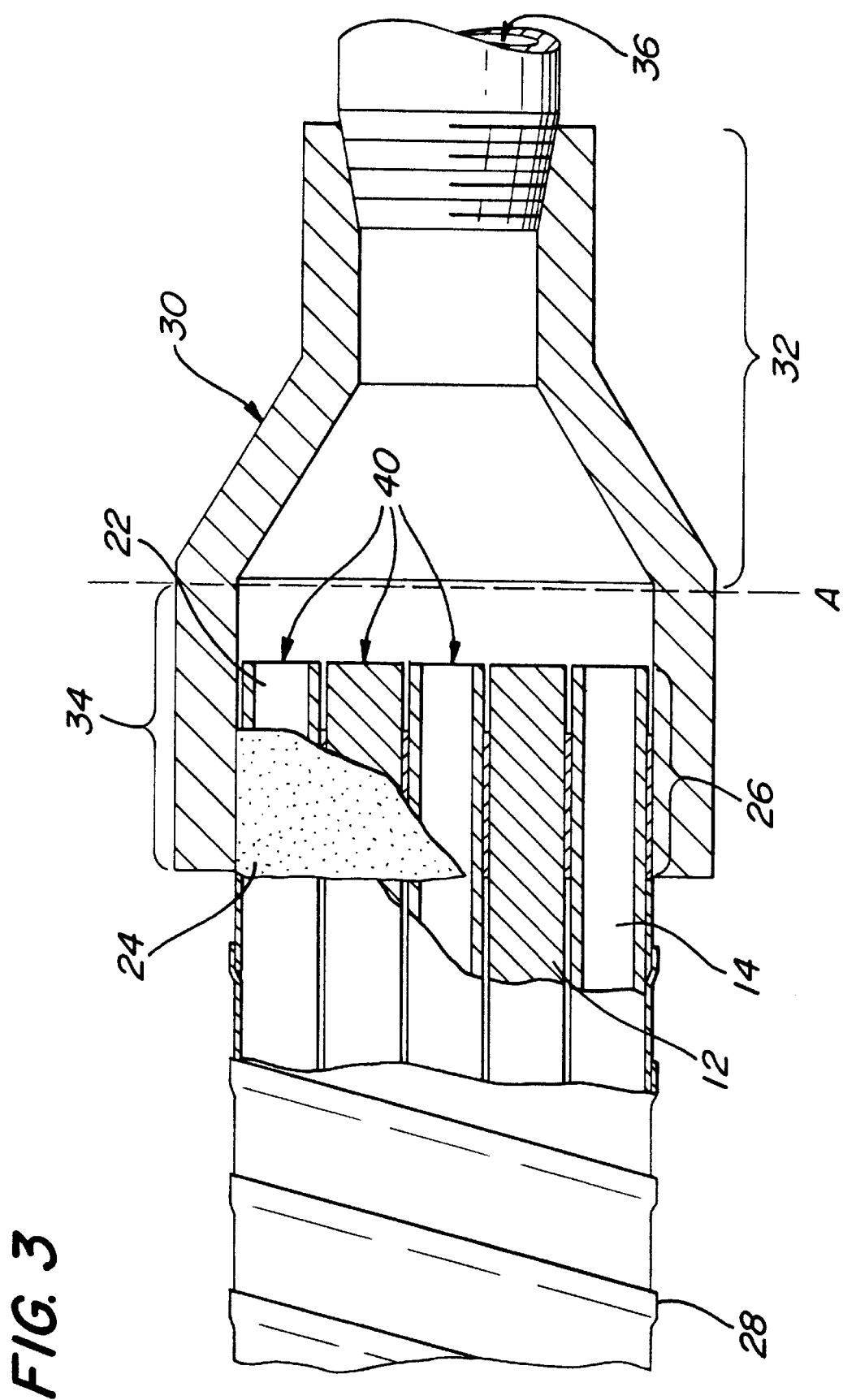
FIG. 3 illustrates a side view of the stator coil lead ends inserted into the header.

Referring to the drawings wherein like numerals indicate like elements throughout, FIG. 1 depicts the header and stator coil sub-assembly that may be susceptible to the water leakage problem discussed above. In this design, the hollow conductor strands 14 and solid conductor strands 12 are bundled together to form a stator coil 20. After the conductor strands are bundled together and bent to the desired form, an epoxy resin binds the conductor strands 12, 14. The entire stator coil 20 assembly is then wrapped with a groundwall insulation 28. At the lead end 26 (as shown in FIG. 3) of the stator coil 20, where the stator coil 20 joins the header 30, the conductor strands 12, 14 are exposed to facilitate the connection. Thus, the conductor strands 12, 14 are not epoxied or wrapped with the groundwall insulation 28 at that point. This lead end 26 of stator coil 20 is extended into the header 30 to interface stator coil 20 to header 30, completing the electrical/hydraulic circuit.

As illustrated in FIG. 1, during a repair process in accordance with one embodiment of the invention, the header 30 and stator 20 interface is placed in an alignment fixture 50, which is mounted directly to the header 30. This alignment fixture 50 has two halves that are bolted together with bolts 42 leaving alignment guide slot 44 for the saw blade 52 to travel through the header 30. Initially, several of the bolts are removed. As the saw moves through the alignment guide slot 44 and cuts through the header 30, the removed bolts are replaced and other bolts are removed. Thus, the alignment fixture 50 ensures that the cut is square while the saw 54 cuts through the header. After the sectioning is completed, the non-brazed leading portion 22 of the stator coil 20 is exposed. The voids 40 between the conductor strands are then accessed though the opening provided by the outboard portion 34 of sectioned header 30. The result of sectioning the header 30 and the accompanying accessibility to the non-brazed leading portion 22 of the stator coil 20 is illustrated in FIG. 2.

FIG. 3 shows a cross section of the stator coil 20 and header 30 interface taken along the line 3—3 in FIG. 1. In a typical configuration, the stator coils 20 are inserted into the openings in the header 30 at the inboard side 34 of the header 30. Water flows through opening 36 to cool the stator coils 20 during operation of the turbine generator (not shown). As illustrated, only the trailing portion 24 of the lead end 26 is brazed to header 30. The leading portion 22 is not brazed to the header 30, leaving column and row voids 40 between the conductor strands 12, 14. Additionally, a void 40 exists between the walls of the header and along the non-brazed leading portion 22 of the stator coil 20. Problematically, coolant water tends to permeate back through voids 40 and mix with the flux used in the original brazing process. This water and flux mixture forms an acid which eats through the braze and continues back into the stator coil 20 and the groundwall insulation 28. If left uncorrected, this leakage could cause a failure in the generator.

Figure 2:
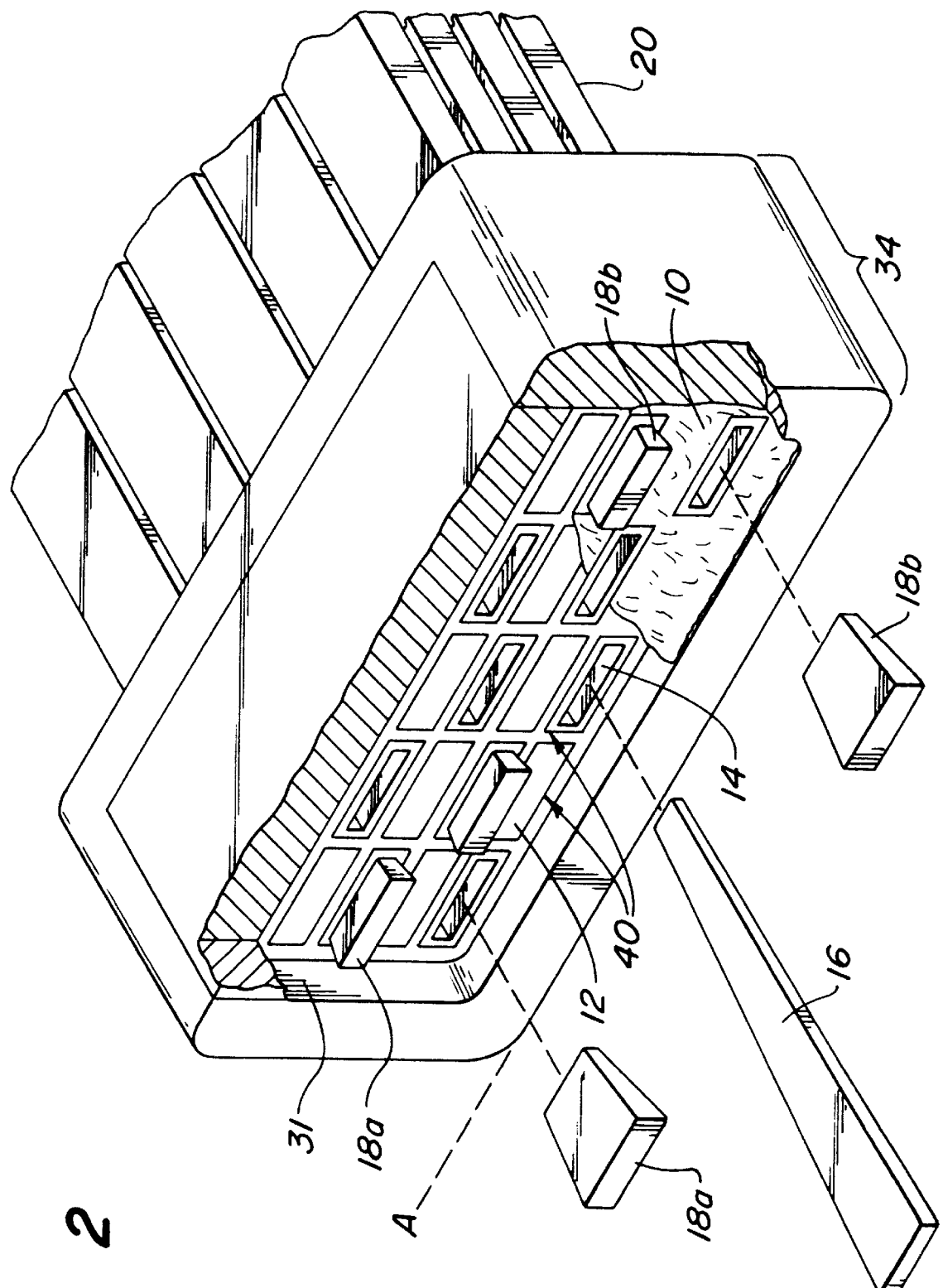
FIG. 2 illustrates a view of the stator coil and a section of the header remaining attached thereto.

The disposition of the voids 40 can also be appreciated from the cross-sectional view provided in FIG. 2. As shown, columns and rows of the voids 40 exist between the conductor strands 12, 14 of the stator coil 20. These voids 40 must be sealed to prevent the development of leak-causing acid.

Copending commonly assigned patent application Ser. No. 08/569,818, filed Dec. 8, 1995, now U.S. Pat. No. 5,760,371 date Jun. 2, 1998, shows a method for repairing the stator coil and header interface to stop the leak while providing a longer term solution to the underlying original braze design problem. According to the repair method of that application, the interface is repaired by sectioning the leaking header at a point beyond the lead ends of the stator coil. As a result of this sectioning, the lead ends of the conductor strands and the voids between them are accessible. The exposed lead ends are then cleaned to remove oxidation build-up. After the lead ends are cleaned, a new braze seal is applied to both seal the leak and seal the voids between the conductor strands, which provides the primary catalyst for the leaks. Cleaned and sealed, the stator coil and header section is joined to a new header and the repair is complete.

The repair process described in U.S. Pat. No. 5/760,371, comprises four major steps. First, a leaking header 30 is sectioned to expose the lead ends 26 of the conductor strands 12, 14. Second, the exposed conductor strands are cleaned to remove oxidation. The opening of each hollow conductor strand 14 is then uniformly sized with the tapered expansion pin 16 illustrated in FIG. 2. Used in this way, the expansion pin 16 ensures that the opening of every hollow conductor strand 14 is substantially the same size and shape and will accept plugs 18a and 18b. The plugs 18a and 18b are used during the cleaning process to prevent the abrasive media from entering the hollow conductor strand 14, and can be fashioned from any suitable material. Third, a braze seal 10 is applied over the voids 40 between the conductor strands 12, 14. The openings in the hollow conductor strands are again plugged before applying the braze seal 10. The polyurethane plugs 18a, used during the cleaning process, are not suitable for this purpose because of the high temperatures experienced during the brazing. Instead, a similarly shaped and sized plug 18b is formed of a high temperature ceramic material, which is inserted in place of the polyurethane plugs. Moreover, to prevent heat damage to the insulation in the stator coil 20, chill blocks are attached to the stator coil 20 to keep the temperature of the stator coil 20 in an acceptable range during the brazing process. Finally, a new header is joined to the sealed stator coil 20 and the header section that remains attached thereto.

Processes for repairing stator coil leakage should possess the following characteristics:

The process should address all coil end leak locations.

The process should address all susceptible coil styles and address all common sources for leaks.

The repair should be a permanent procedure for both "Strap" and "Bottle" style coils The process should allow for coil end repair with the rotor in place.

The repair should be a permanent solution for the Industry.

Global repairs (all coil ends) should be possible in a normal 30 day outage.

A time/cost effective preventive technology for non-leaking coils should be included.

A vacuum impregnation process (VPI) has been used for many years in the manufacture of high voltage coils. Coils made with this technique have excellent electrical characteristics by all measures including voltage breakdown, power factor, DC leakage, thermal cycling, and mechanical toughness, and have exhibited excellent service experience. This invention applies the VPI process to eliminate leakage in water cooled stator coils susceptible to leakage through the consolidation braze (or, clip to strand braze), by crevice corrosion or other means.

For the VPI process to be effective in this application two things are required:

1. The part to be vacuum impregnated must be removed of all atmospheric air/water vapor down to the level of one torr or less; and 2. The impregnating resin must be a low viscosity type in order for it to flow easily into all the tiny capillary passages that are found in the stator coil subassembly.

A typical coil repair begins by performing a thorough automated water evacuation coil drying process and vacuum decay test to identify suspect coils. Leaking coils are confirmed by capacitance mapping of the coil insulation and then the leak source is precisely located using trace gas leak detection equipment.

Once the leaking coils have been identified and thoroughly dried out the repair process begins. Coil hoses, hydraulic fittings and the coil connection insulation; are removed to gain sufficient access to the coil ends being repaired. The existing clip is sectioned just beyond the coil strand stack and the outboard section of the clip is removed.

As shown in FIG. 1, an alignment fixture that mounts directly to the coil end, is used as a guide so that the face of the coil end is cut square. Specific measures are taken to prevent any foreign materials from entering the system through the hollow conductors. The exposed strand area inside the remaining clip is then abrasively cleaned to prepare the surface for the tungsten inert gas (TIG) overlay.

The TIG overlay is applied to consolidate the individual strands to the remaining section of the clip. The overlay is applied around each of the cooling water passages in the strand stack, extending out to the edge of the remaining portion of the clip to preclude future problems with porosity or window braze inclusions.

Once the TIG overlay has been applied, flow through the hollow conductors is verified. A pressure test is performed using trace gas, to determine that there are no leaks between the coil strands and the remaining portion of the clip. After the results of the trace gas test indicate that the TIG overlay does not leak and that the hollow strands are unobstructed, the coil end is prepped for brazing on the new clip.

A brazing fixture featuring self-aligning, self-sizing, L-shaped chill block is mounted directly onto the coil end. Mounted to these chill blocks is a spring loaded support that holds the new clip and braze material in the proper position during the brazing process.

The present invention uses a VPI process that can be applied to either a leaking or non-leaking stator coil. If the coil is leaking as determined by the standard hydrogen leakage test, the repair process described in the above mentioned application Ser. No. 08/569,818 may be used to repair the assembly. Then in accordance with this invention, a resin or resin composite is injected into voids between the conductors and may be positioned between a TIG braze overlay and the original consolidation clip-to-strand braze, or from the original consolidation braze and extending from the header/clip back several inches into the coil. This is achieved by using the VPI process to insert a substantially air-free and void-free quantity of suitable resin, possibly under pressure. The result is a solid resinous leak barrier which is well bonded to the copper strands and completely encloses them. Any previously established corrosion cavity penetration within the copper strands would then be required to tunnel through the resin barrier zone before it can provide a leak connected to the free internal coil. Since corrosion cavity propagation is known to be rather slow (on the order of no more than 0.05 inches per year), adding the resinous barrier can delay for many years the creation of a leak into the interior zone of the coil. The groundwall damage portion of the process is thus delayed, past the point of time at which it could provide any significant shortening of life of the a particular generator stator winding. For example, a resinous barrier of four inches in length would provide an extension of the time required to penetrate into the open intra-strand region on the order of 80 years.

Figure 4:
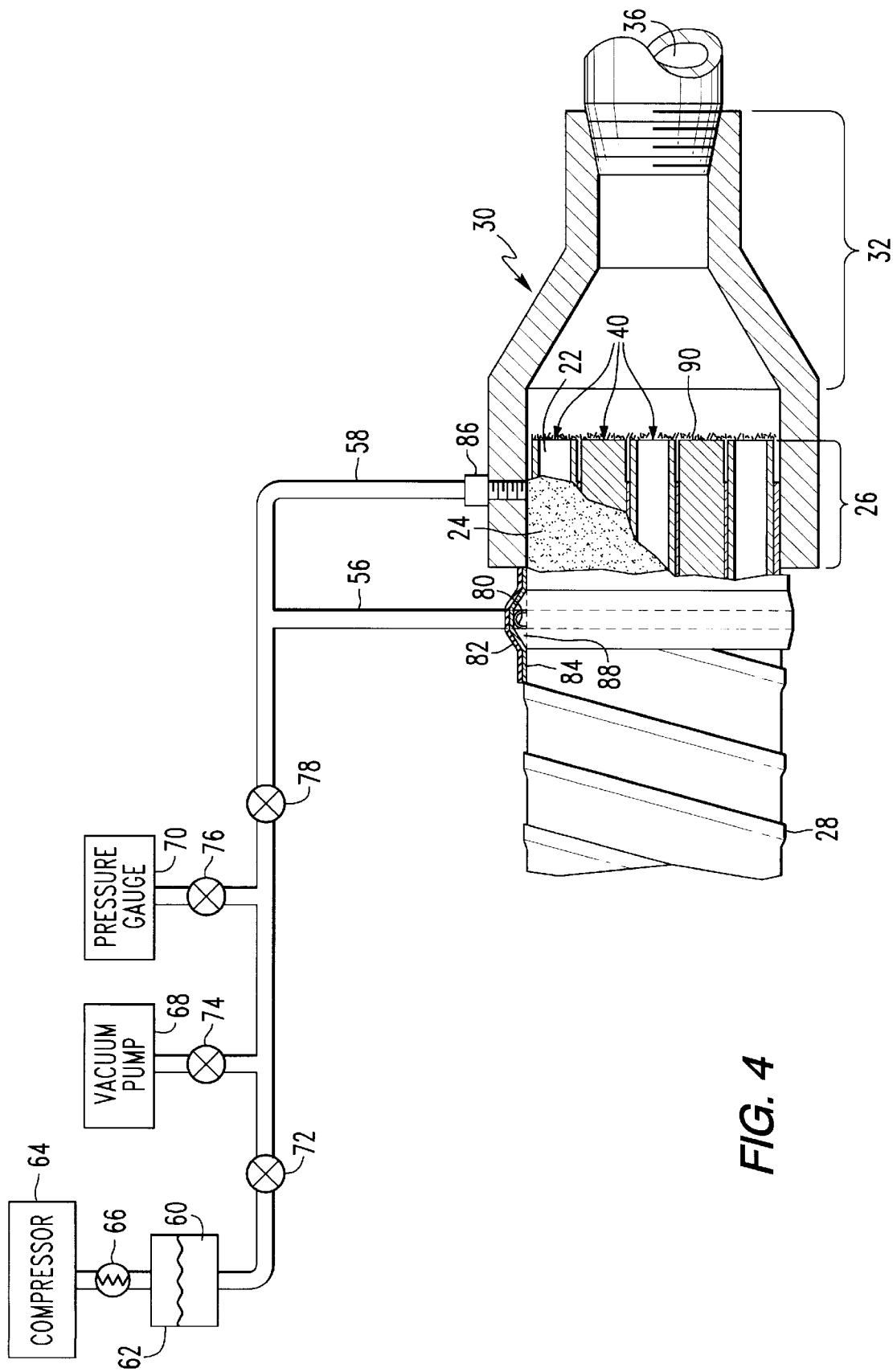
FIG. 4 illustrates the apparatus used to inject resin into voids in the stator coils.

FIG. 4 illustrates, in partial block diagram form, the apparatus used to perform the method of this invention. A first resin delivery tube 56, and optionally a second resin delivery tube 58, are used to deliver resin 60 to the structure to be impregnated. The resin is contained in a reservoir 62 which is pressurized by a source of pressurized air, such as compressor 64 and regulator 66. A vacuum pump 68 is used to create the vacuum needed for the impregnation, and a pressure gage 70 (preferably a digital gage) is used to monitor the pressure in the tubes and structure. Valves 72, 74, 76 and 78 are used to connect the reservoir, vacuum pump, and pressure gage to the tubes.

To couple the first resin delivery tube to the conductor bundle, the end portion 80 of the tube is cut longitudinally to form a semicircular portion, and that semicircular portion is positioned adjacent to the conductor bundle as shown in FIG. 4. A fiberglass tape 82 and resin layer 84 are wrapped over the end portion of the tube 56 to form a vacuum/pressure chamber 88. The second resin delivery tube, if used, can be coupled to the clip using fitting 86. That fitting is typically a pre-existing fitting that would be used for leak testing. The TIG overlay braze 90 forms a seal at the ends of the conductors.

The invention is applicable to two possible cases. One case is where the coil is tested and found to be leaking. In that case, the TIG braze overlay described above is done first. Then two small tubes 56 and 58 are attached to the coil assembly as shown in FIG. 4. The other case is when the coil is tested and not found to be leaking, but vacuum impregnation can provide additional leakage resistance in the future. In that case, only a single tube 56 is attached. The tubes may be constructed of fiberglass.

To perform the method of this invention, the apparatus of FIG. 4 is connected as shown and valves 74, 76 and 78 are opened. A vacuum is then pulled on the outside of the conductors and held for a predetermined period of time, for example 10 minutes. During this time, the internal openings of the conductors are maintained at atmospheric pressure. If the vacuum has not deteriorated after the predetermined period of time, an operator can be confident that there are no leaks. Then valves 74 and 76 can be closed, and valve 72 can be opened to permit the resin to be injected under pressure into any spaces around the conductors. After the resin is pumped in and cured, the fiberglass tube is sniped off flush and standard insulation materials are applied over the tube end. By injecting the resin into the two areas shown in FIG. 4, substantially all voids and leak paths, both existing and those that might form in the future, are sealed. The preferred resin for this process is a low viscosity resin (e.g. less than 20 CP) which has been used in electrical equipment for many years. One such resin is B-2-120 Solventless Resin manufactured by Ranbar Electrical Materials, Inc.

If the coil is tested and found to be leaking by the standard helium leak test, then the TIG overlay is necessary to be able to pull a vacuum. If the leak is not sealed prior to the resin impregnation, the resin would fill up the hollow strands. Therefore, the drawing of a vacuum and its continuation after disconnecting the vacuum pump and observing the digital vacuum gage is an important parameter. In both cases, whether using one feed line or two, the vacuum is pulled on the outside of the hollow copper strands (conductors) of the coil. If the vacuum cannot be pulled and maintained after the pump is separated from the system, the resin would not be injected until appropriate action is taken so that a vacuum can be sustained without the pump. Also, whether using one line or two, once the vacuum is achieved and held, the actual pumping is always the same. Simply isolate the vacuum pump and digital gage so that the resin does not flow into them. This is done by closing the valves 74 and 76 just upstream of these items. Then the valve 72 at the outlet of the resin tank 62 is opened and the air pressure on top of the resin tank pumps the resin into the coil under a pressure of at least 40 psig.

The number ten brass fitting 86 that is shown in the header (clip) is located in such a way that resin is pumped into the area between the nes Silfos TIG overlay 90 and the original factory braze. The TIG overlay does not penetrate all the way to the original factory braze leaving a chamber composed of interconnecting gaps and capillaries. The resin delivered to this area fills all of these. The other line, the fiberglass tube 56, fills the area behind the clip including any leak paths that may run up the arm of the coil. This chamber consists of the voids in the coil, from original manufacture, which may be part of a water leak path, including that penetrating the original factory braze. The vacuum chamber 88 is formed by wrapping the fiberglass tube 56, which is mitered and bonded directly to two sides of the exposed copper. The fiberglass tube is sanded hemicircular and protrudes out through two layers of fiberglass tape.

It should now be apparent that the invention comprises several steps which are performed to impregnate voids between coil strands. First, the coil is stripped locally behind the cap exposing the open strand-to-strand areas beneath, and a VPI manifold made from a resin delivery tube and glass wrapping, is bonded in position. Next, layers of glass banding and resin are applied and allowed to harden. The preparation of the coil and installation of the VPI manifold is intricate and must be done with precision in order to seal properly for vacuum impregnation. The VPI manifold is then connected to a vacuum system. Before attempting to pull a vacuum the valve system is checked for leaks. The vacuum pump is then connected and vacuum measurements are made with a digital vacuum gage. This gage determines whether sufficient vacuum has been achieved and whether the rate of vacuum decay is within acceptable limits after the pump is shut off. Once these criteria are met, resin enters the coil and flows very rapidly through the capillaries and gaps. If the stator coil has been repaired by the repair process of application Ser. No. 08/569,818, and VPI is performed, resin is added directly to the clip just inboard of the TIG overlay. Low viscosity vacuum impregnating resin is injected into the interconnecting capillaries that exist between the TIG overlay braze and the original braze including the existing leak path. The final result of the TIG overlay and VPI resin is a stator coil that is sound mechanically, electrically and hydraulically. The coil is restored to its full capacity to perform the remainder of its useful life.

When the repair method of application Ser. No. 08/569,818 is first used to repair a leaking coil, the TIG overlay and original clip-to-strand braze can be used to provide for an in-situ vacuum/pressure chamber. To form a vacuum/pressure chamber in the region behind the clip, permanent or non-permanent wraps, bags and other enclosing devices may be used to enclose the intra-strand region adjacent to the clip, and clip-to-strand braze.

The present invention addresses leaks in hydraulic/electrical component braze connections, the "clip to window" braze joint, the "clip to coil" strand or "consolidation" braze and leaks resulting from porosity in the cast components themselves. The invention also serves as a prevention technology for addressing the potential for leakage in coils of susceptible design. Vacuum Pressure Impregnation (VPI) technology is the most cost effective way to address this problem in terms of cost for service, plant availability and reliability.

The field application of the VPI process to water cooled stator coils has several advantages:

1. The resin material has very low viscosity at room temperature allowing it to easily flow during the VPI process. All intra-strand zones are fully impregnated, including the very tight spaces between the strand edges.
2. The resin material bonds well to the oxidized copper surface left over from the consolidated braze process. In fact, the oxidized surface aids bonding.
3. Resistance to the effects of corrosion are improved due to the fact that should a preexisting crevice corrosion leak passage penetrate through the original factory braze, the water path would then terminate in a layer of solid epoxy-copper composite block behind the clip. As a result, the corrosion process would have to continue along a copper strand(s) through the layer before it could possibly contact the mica groundwall insulation. At published rates of corrosion and using a layer that is, for example, six inches thick, this would clearly take decades to accomplish.
4. The addition of the impregnating resin to the voids found directly behind the clip transform the stator coil into a composite structure thereby greatly increasing its bending stiffness in this area. Reconnecting all the copper strands into a unitized structure only increases resistance to high cycle copper fatigue.

Although the repair process of application Ser. No. 08/569,818 (clip end replacement combined with a TIG weld overlay of the consolidated area) is a highly effective solution, the repairs are costly and require significant time to implement. The TIG overlay repair for leaking coils combined with the VPI process for nonleaking coils offers a total cost effective solution for utilities wanting to make a global repair.

In addition to leaking headers (clips) due to poor braze quality and ongoing effects of water crevice type corrosion, leaks can also occur in other connection fittings which are made from cast copper. These are typically sand castings that tend to have a high degree of porosity which occurs naturally. One known method to repair such leaks is to replace the cast fitting with a machined copper fitting. However, if one or more such cast fittings in a particular machine are repaired in this manner, there is still a concern about the remaining cast fittings that may leak in the future. Replacing all of the cast fitting would be expensive. This invention can achieve sufficient leak prevention by glass bead blasting the leaking cast component to completely clean the surface, and then applying a layer of sealant to the entire outer surface. One such sealant is 80A durometer polyurethane two-part coating and another is a flexible high-bond strength epoxy.

The present invention may be embodied in other specific forms without departing from the spirit or essential attributes thereof, and accordingly, reference should be made to the appended claims, rather than to the foregoing specification, as indicating the scope of the invention.

What is claimed is:

1. A process for preventing leaks in water cooled stator coils having a plurality of hollow conductor strands each having a lead end, and wherein the lead ends of the conductor strands are joined to a header, comprising the steps of:
   confirming that no leak path exists around the conductor strands of one of the stator coils where it passes through the header;
   providing a vacuum enclosure around a portion of said stator coil in proximity to the header;
   applying a vacuum to the portion;
   measuring the vacuum to confirm that the rate of vacuum decay is below a predetermined limit; and
   injecting a resin into voids in the portion.

2. A process for preventing leaks in water cooled stator coils according to claim 1, wherein the resin has a viscosity of less than 20 centipoise.

3. A process for preventing leaks in water cooled stator coils according to claim 1, wherein the resin is injected under pressure.

4. A process for preventing leaks in water cooled stator coils according to claim 1, further comprising the step of:

waiting for a predetermined period of time after applying the vacuum and prior to injecting the resin.

5. A process for preventing leaks in water cooled stator coils according to claim 1, wherein the vacuum reduces the pressure around the portion to less than one torr.

6. A process for preventing leaks in water cooled stator coils according to claim 1, wherein the header includes cast components, further comprising the steps of:

cleaning an external surface of the cast components; and applying a layer of sealant to the external surface.

7. A process for preventing leaks in water cooled stator coils according to claim 6, wherein the sealant comprises 80 A durometer polyurethane.

8. A process for preventing leaks in water cooled stator coils according to claim 6, wherein the sealant comprises a flexible high bond strength epoxy.

9. A process for preventing leaks in water cooled stator coils having a plurality of hollow conductor strands each having a lead end, and wherein the lead ends of the conductor strands are joined to a header, comprising the steps of:

sectioning the header into an outboard section, and into an inboard section that remains attached to the conductor strands, such that the lead ends of the conductor strands are accessible;

cleaning the lead ends of the conductor strands and the attached inboard section;

applying a water-tight braze seal over the lead ends of the conductor strands;

after the braze seal has been applied, joining the stator coil and the inboard section to a second outboard section;

applying a vacuum to the inboard section; and injecting a resin into voids in the inboard section.

10. A process for preventing leaks in water cooled stator coils according to claim 9, wherein the resin has a viscosity of less than 20 centipoise.

11. A process for preventing leaks in water cooled stator coils according to claim 9, wherein the resin is injected under pressure.

12. A process for preventing leaks in water cooled stator coils according to claim 9, further comprising the step of:

waiting for a predetermined period of time after applying the vacuum and prior to injecting the resin.

13. A process for preventing leaks in water cooled stator coils according to claim 9, wherein the vacuum reduces the pressure around the portion to less than one torr.

14. A process for preventing leaks in water cooled stator coils according to claim 9, wherein the header includes cast components, further comprising the steps of:

blasting an external surface of the cast components; and applying a layer of sealant to the external surface.

15. A process for preventing leaks in water cooled stator coils according to claim 14, wherein the sealant comprises 80 A durometer polyurethane.

16. A process for preventing leaks in water cooled stator coils according to claim 14, wherein the sealant comprises a flexible high bond strength epoxy.

17. A process for repairing a leak in a water cooled stator coil having a plurality of hollow conductor strands each having a lead end, wherein the lead ends of the conductor strands are joined to a header and to each other by a consolidation braze which has degraded and leaked during operation of the stator coil, the process comprising the steps of:

sectioning the header into an outboard section and an inboard section which remains attached to the conductor strands, such that the lead ends of the conductor strands are accessible;

applying a water tight braze seal around each of the lead ends to consolidate the individual conductor strands to the inboard section of the header;

joining the inboard section to a second outboard section;

applying a vacuum to a first volume between the conductor strands on an inboard side of the consolidation braze;

measuring the vacuum to confirm that the rate of vacuum decay is within a predetermined limit;

injecting a resin into the first volume.

18. The process of claim 11, wherein a second volume exists between the conductor strands in the area between the consolidation braze and the water tight braze seal, further comprising the step of injecting a resin into the second volume.

19. The process of claim 18, wherein the step of injecting a resin into the first volume and the step of injecting a resin into the second volume are performed simultaneously.

* * * * *